No. 834,235. PATENTED OCT. 23, 1906.
A. C. HEINY.
ELECTRIC SIGN.
APPLICATION FILED DEC. 15, 1904.

Witnesses
Inventor
Anatole C. Heiny

No. 834,235. PATENTED OCT. 23, 1906.
A. C. HEINY.
ELECTRIC SIGN.
APPLICATION FILED DEC. 15, 1904.

Witnesses:

Inventor
Anatole C. Heiny

No. 834,235. PATENTED OCT. 23, 1906.
A. C. HEINY.
ELECTRIC SIGN.
APPLICATION FILED DEC. 15, 1904.

Witnesses.
Arthur L. Slee.
M. Regner.

Inventor
Anatole C. Heiny
by B. Osborn
atty.

No. 834,235. PATENTED OCT. 23, 1906.
A. C. HEINY.
ELECTRIC SIGN.
APPLICATION FILED DEC. 15, 1904.

Witnesses:
Inventor

No. 834,235. PATENTED OCT. 23, 1906.
A. C. HEINY.
ELECTRIC SIGN.
APPLICATION FILED DEC. 15, 1904.

Witnesses.
Arthur L. Slee
M. Regnier

Inventor.
Anatole C. Heiny
by G. E. Osborn
Atty.

UNITED STATES PATENT OFFICE.

ANATOLE C. HEINY, OF NEW YORK, N. Y., ASSIGNOR, BY DIRECT AND MESNE ASSIGNMENTS, TO HEINY ELECTRIC CO., A CORPORATION OF NEW YORK.

ELECTRIC SIGN.

No. 834,235.　　　　Specification of Letters Patent.　　　Patented Oct. 23, 1906.

Application filed December 15, 1904. Serial No. 236,999.

*To all whom it may concern:*

Be it known that I, ANATOLE C. HEINY, a citizen of the United States of America, residing in New York, in the county of New York and State of New York, have invented new and useful Improvements in Electrical Signs, of which the following is a specification.

This invention relates to improvements made in electrically-illuminated signs in which incandescent lamps are arranged to display letters in outline. In signs of this character the lamps are arranged generally in a number of separate frames or boxes, usually termed "panels," in each of which the lamps are connected together in certain groups or sets so as to form when illuminated the outline of a letter or a numeral, according to the group or set of lamps which may be selected and connected in closed circuit with a source of electric current.

In my present improvements the lamps in each panel can be connected singly or in groups to circuit-closing contacts in a switchboard of novel construction containing a separate selecting device for each letter or character that the lamps in the panel are capable of forming by different combinations, and each selecting device is actuated electrically by means so controlled from a single keyboard that by depressing any selected key the particular selecting devices controlled by the key will put the current on the proper lamps in the panel to show in illuminated outline the particular letter or character borne by the key. This switchboard and its circuit-selecting means render it practical to operate and control any number of panels from a single switchboard containing keys for producing at will in any given panel the letter or character individual to the key operated, as well as to produce in one panel after another given letters to form a word or a sentence simply by depressing and releasing the proper keys in the keyboard, one after another.

The improvements embraced in and constituting my present invention comprise a novel system of lamp-circuits, each having separate circuit-closing devices in a single switchboard and electrically-actuated circuit-selecting devices combined with a single keyboard containing a separate key for every letter or character.

The improvements include also circuit-closing devices and electrically-actuated cut-out mechanism controlled from the keyboard and operating to automatically disconnect the keyboard-actuated circuits from one panel and transfer them to the next panel through the movement of the key, whereby the selecting means is automatically put in operative connection with one panel after another and the letters are illuminated in the required order throughout the whole number of panels or any number less than the whole number to display the word or sentence by the simple depression and release of the keys in the keyboard.

The improvements include also novel construction and arrangements of illuminating-circuits in groups or separate sets, circuit-selecting devices, and electrically-actuated circuit-closing mechanism operating to connect the selected circuits in each group or set directly with or into the source of current to maintain the same in operative condition, while the circuit-selecting devices actuated from the keyboard are automatically disconnected from the illuminated circuits in one group or set and transferred to the next group or set of circuits for operation.

The invention includes, further, certain novel construction and combination of lamp-circuits, circuit-selecting devices, circuit-closers, and keyboard mechanism, producing an improved electrical apparatus for displaying in illuminated outline letters or characters in different arrangements to form words or sentences or arbitrary signals and for changing the same at will, all as hereinafter fully described, and pointed out in the claims at the end of this specification.

The accompanying drawings, that form a part of this specification, illustrate the construction of one letter-panel containing a number of lamps with which can be formed the outlines of any letter of the alphabet or a numeral, and the different figures and diagrams thereof represent the circuit-selecting devices, circuit-closers, and controlling means for a portion of three panels and a common keyboard.

A complete sign or apparatus as set up for advertising purposes having the capacity to display a number of letters to form words or sentences is composed of a number of panels A, each of which will be the duplicate, substantially, of the panel represented in Figs. 4, 5, 6, and 7. All the panels are connected with the switchboard B, in which the circuit-selecting devices controlling the lamp-circuits of all the panels are actuated by electrical means and operated from a single keyboard D. These three parts containing the novel features of the invention are combined together to form the complete apparatus. The following description of the same in connection with a portion of the circuits and the circuit-controlling devices of two panels will enable any person skilled in the art to which my invention relates to apply these improvements to any number of panels or groups of illuminating-circuits without further explanation.

The construction of the panel is here described in connection with Figs. 4, 5, 6, 7 of the drawings. The board $a$ is a panel of insulating material of rectangular shape having on the front the screw-sockets $d$ for the lamps C and carrying on the back the circuit-closing devices and their actuating-relays. The front side and back of this board are covered, and the entire mechanism on front and back is closed in by the sheet-metal box $a'$ $a^2$ $a^3$. On the inner side of the front cover $a'$ are secured tubular reflectors $f$, that are fixed around apertures $a^4$ in the front and are arranged to fit over and inclose the lamp-bulbs C on the front of the board $a$. The front $a'$ is removable to give access to the lamps and their connecting-wires, and the rear $a^3$ can be detached when the mechanism on the back is to be reached for inspection or repairs.

The light-bulbs C, placed in rows across the front of the panel, are arranged in such order at intervals apart that by different combinations of the bulbs selected from the different rows and connected in circuit with the supply of current all the letters of the alphabet or any numeral can be produced.

Figure 4:
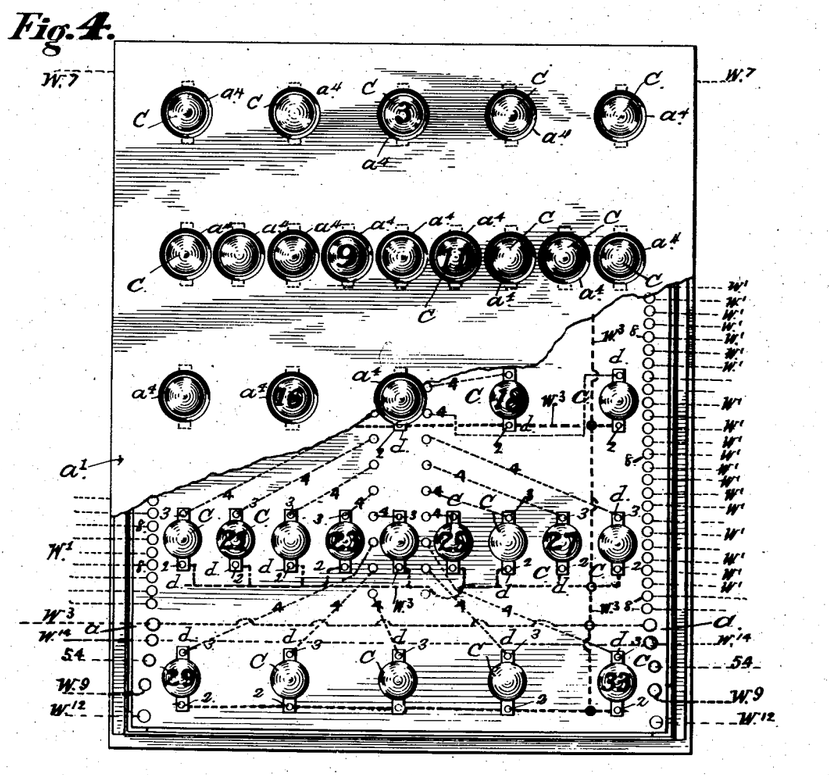
Fig. 4 is a front elevation of one of the panels, showing a portion of the front of the box broken away to expose the wiring.
Figure 5:
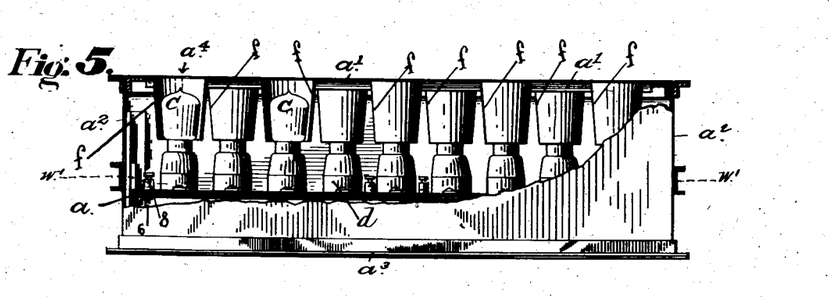
Fig. 5 is a top view of the panel with a portion of the box broken away to show the lamps and their reflectors.

In the present construction thirty-three incandescent bulbs distributed in five rows horizontally across the panel at intervals apart, as shown in Fig. 4, will enable any letter or numeral to be produced in outline.

At each lamp-socket are provided two binding-posts 2 3, with which the terminals of the lamp-filament are connected when the lamp is screwed in place in the socket. One of these posts 2 at every socket is connected by a wire $W^3$ to a common conductor W, that leads to one side of the generator G; but from the other post 3 of each lamp-socket a metallic connection is made by a wire 4 with a hinged contact-plate 7 on the back of the panel. Thus each light-bulb C has one side of its filament always connected into the common conducting-wire $W^3$; but the remaining side is connected to a separate contact-plate 7.

Figure 6:
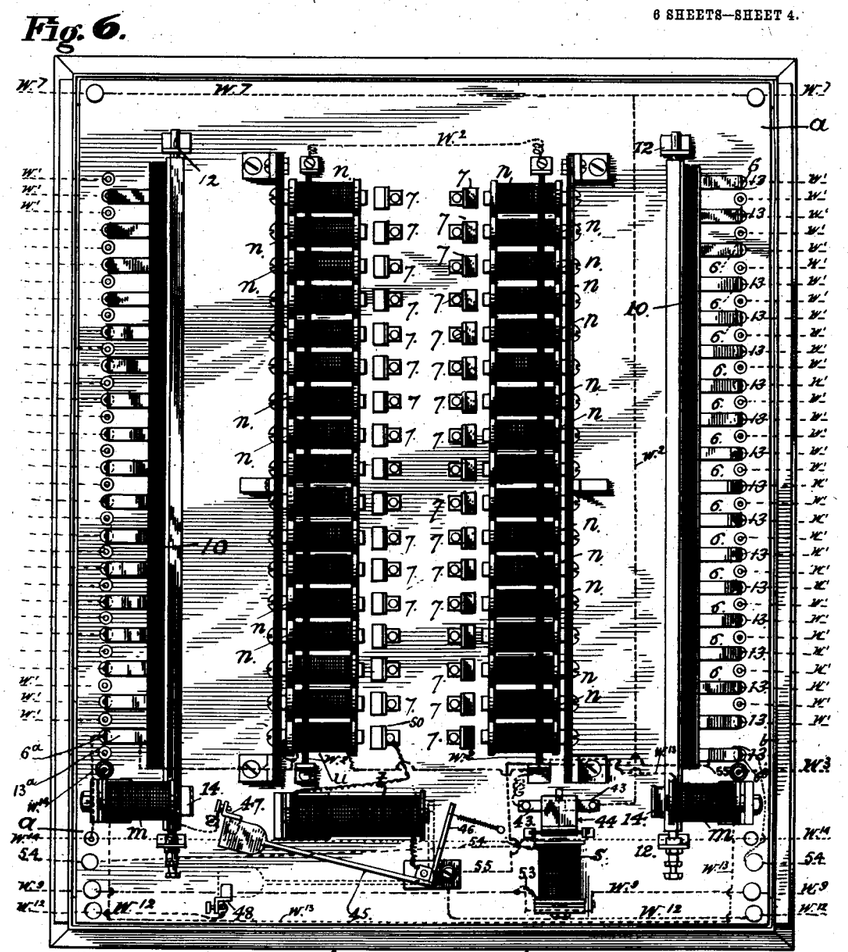
Fig. 6 is a rear view of the panel on the front of which the lamps are fixed.
Figure 7:
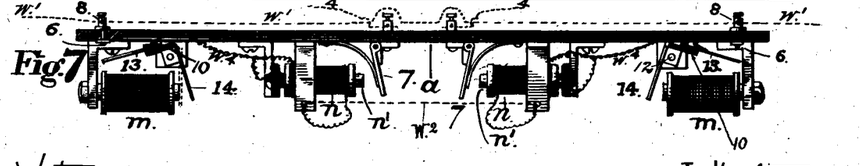
Fig. 7 is a top view of Fig. 6 without the lamps.
Figures 8, 9, 10:
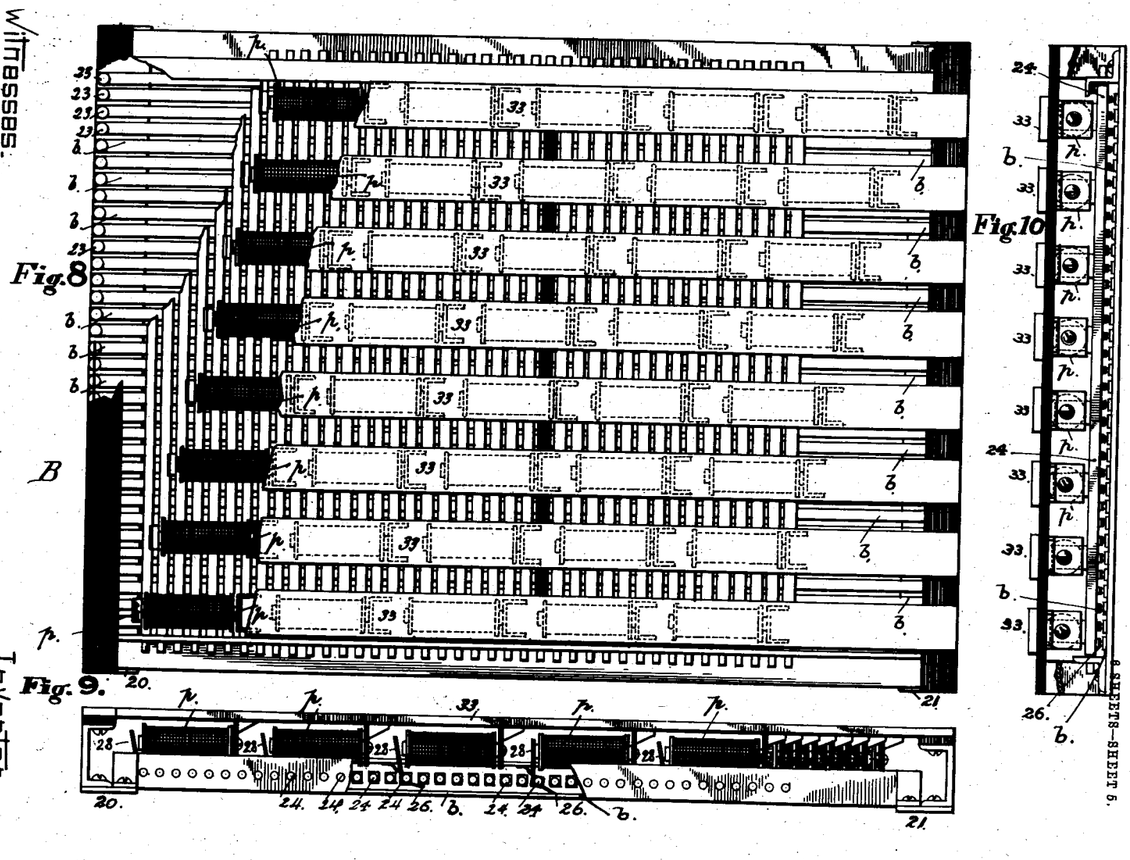
Fig. 8 is a plan or top view of the switchboard containing the circuit-selecting devices for all the lamps in all the panels.
Fig. 9 is a side view of Fig. 8.
Fig. 10 is an end view of the same figure, taken from the right side of Fig. 8.
Figures 11, 12, 13:
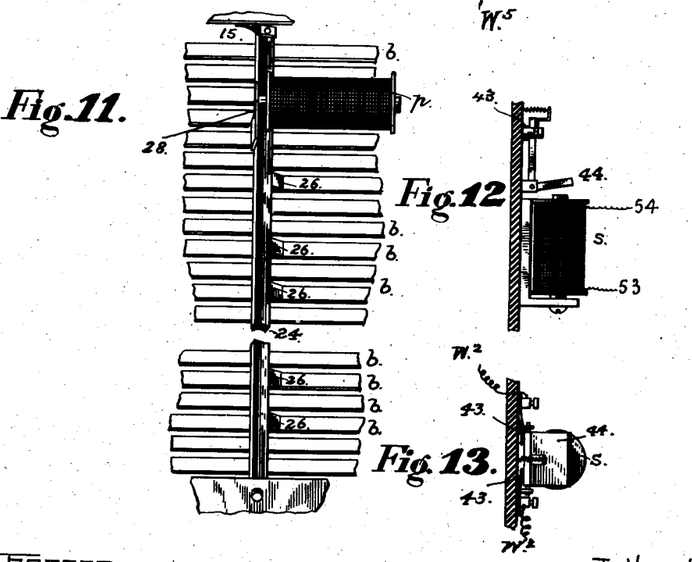
Fig. 11 is a top view, on an enlarged scale, of a portion of the switchboard, showing the fixed contact-strips and one of the movable selecting-bars and its actuating-magnet.
Fig. 12 is a side view of one of the circuit-closing relays on the panel.
Fig. 13 is a top view of Fig. 12.

Along the sides of the panel binding-posts 8 constitute the terminals of a series of conductors W', running from the posts to the switchboard B, where each wire connects separately with a stationary contact-bar $b$. These conductors W' and the contact-bars $b$ correspond in number with the light-bulbs or groups of light-bulbs. For convenience of construction and to bring the parts into compact arrangement the binding-posts 8 are arranged in rows along the sides of the panel and the contacts 7 in rows near the center thereof, as shown in Fig. 6 and Fig. 7, though this particular arrangement may be changed if found desirable.

A bar 10, of insulating material, hinged at 12, carries a series of spring-contacts 13 and a member 14, that forms the armature of an electromagnet $m$, by the attraction of which the bar 10 is turned, and the whole set of contacts 13 is closed on the ends 6 of the binding-posts 8 beneath those contacts. On the other hand, when the circuit through magnet $m$ is opened the contacts 13 leave the points 6 and break the connections. As the contacts 6 are preferably arranged in two sets, as shown in Figs. 6 and 7, there are two of these bars 10 and magnets $m$.

Between the contacts 13 and 7, that are situated behind the light-bulbs, as already described, are situated the circuit-closing magnets $n$, corresponding in number to the contacts 7 and each one having one end of its coil connected to a contact 13 and the other end to a conductor $W^2$, running to one side of the generator G. In addition to this connection the core $n'$ of each magnet $n$ is directly and separately connected at the rear end to the same contact 13 by a wire $W^4$ in such manner that when the hinged contact 7 is attracted to the core and the contacts 13 6 are opened the circuit will be from the wire $W^2$ through the coils of the magnet, thence by the wire $W^4$ to and through the core and the contact 7 held against it, and thence to that light-bulb on the front of the panel having connection with the contact 7.

Each one of the magnets $n$ is brought into condition for operation by the act of closing the contacts 13 on the terminals 6 of the conductors $W'$; but only those magnets of the set $n$ through which the circuit is completed at the switchboard B will become magnetized and will operate to close the lighting-circuits connected to their respective contacts 7.

Each light-bulb or group of light-bulbs on the panel is represented on the back of the panel, therefore, by a separate contact 7, a circuit-closing magnet $n$, and circuit-closing contacts 6 13. In the illustrated construction of my invention the stationary bars $b$ at the switchboard B correspond in number to the circuit-closing relays $n$ and the lamps of a panel. They are the individual terminals for the corresponding conductors $W'$, leading from the different panels to the switchboard—that is to say, the several conductors $W'$, that are individual to the circuit-closing electromagnets $n$ and the associated contacts of the first lamps of all the panels, are connected to the first bar $b$. The conductors $W'$ for the electromagnets for the second lamps of all the panels have the second bar for their terminal, and so on throughout the whole number of panels, so that all the lamps that have a common position on the different panels have connection with one and the same contact-bar in the switchboard. A circuit closed through any one bar, therefore, may cause the current to flow not only to the electromagnet in the first panel with which that bar is in electrical connection, but also to the corresponding magnet in every other panel. By selecting and connecting into the generator G at the same moment different bars $b$ it will be seen that the current would be caused to flow through all the magnets that are connected with the selected bars, and these will in turn operate to close the circuits through the corresponding lamps, and thus the illuminated lamps may be caused to form desired letters at the panels. This operation is confined to one panel at a time, however, by circuit-controlling mechanism that operates to confine the application and flow of the illuminating-current to a single panel at a time and also to connect the operating-circuits of the panels directly with or into the switchboard in regular succession, one panel after another.

The construction and operation of this controlling means will be described hereinafter in connection, more particularly, with the diagrams Figs. 2 and 3.

Referring now to Figs. 8, 9, 10, and 11, representing the construction of the switchboard B, the two bottom rails 20 21, of insulating material, support at the ends a set of thirty-three metallic contact-bars $b$, permanently fixed in parallel rows at intervals apart longitudinally of the switchboard and all insulated from one another. These bars $b$, which I have termed the stationary contact-bars of the switchboard, are the terminals of the conductors $W'$, that are carried from the binding-posts 8 of the panels to the switchboard, where they are separately tied to the bars $b$ at one end of the board, where binding-screws 23 are provided. In making these connections the conductors $W'$ are carried from the switchboard in a cable of insulated wires to the last panel in the sign or to the last panel in the lowest row of the sign, where there is more than one row of panels, and at that end the wires in the cable are distributed and individually connected to their respective binding-posts 8 on the side of the panel and thence carried through the whole set or number of panels in the same relative order, so as to electrically connect like circuit-closing magnets in all the panels with the same stationary contact $b$ at the switchboard. Over these stationary bars and insulated from them are as many rock-shafts as there are letters, figures, punctuation-marks, and other signs desired to be flashed on the panels. Each rock-shaft is supported above the stationary bars and normally out of contact with them and carries a series of contact-tongues 26, which under the movement of the rock-shaft in one direction will touch and make metallic connection between it and such ones of the stationary bars as are situated under the contacts 26. By the number and position of the contacts 26, therefore, are determined what contact-bars *b* will be selected and which operating-circuits in the panel will be closed on turning the rock-shaft so as to set its contacts 26 against the bars below. By the arrangement of these contacts along the rock-shaft in proper position over the stationary contact-bars *b*, which it is necessary to select in order to form a given letter in the panel, the simple movement of the rock-shaft 24 will act to simultaneously close the generator-circuit on all those bars, it being understood that any rock-shaft is connected into one side of the generator-circuit at the moment it is set against the contact-bars.

In the present construction, for illustration, the contacts on the first rock-shaft 24 being so arranged at intervals along the shaft that there is one contact situated directly over each of the third, ninth, eleventh, sixteenth, eighteenth, twenty-first, twenty-third, twenty-fifth, twenty-seventh, twenty-ninth, and thirty-third stationary bars *b* the circuits controlled by those bars will be closed at the instant that the rock-shaft is turned, but the remaining circuits will remain open. The corresponding lamps in the panel being selected will form the outline of the letter "A," (see Fig. 4,) and the circuits being completed at the panel through the circuit-closing devices operated from the switchboard the panel will display that letter as long as the circuits remain closed.

The contacts 26 are arranged in the above-described manner on each rock-shaft to select the proper contact-bars *b* for a given letter, and there is provided a separate rock-shaft for each letter of the alphabet and each numeral where the panels are formed, as in the present sign, to display both letters and figures.

Different combinations of the lamps in the panels to produce different arbitrary forms for signaling or for secret transmission of messages by illuminated characters can be produced in the same manner by providing rock-shafts on the switchboard on which contacts 26 are placed in proper order to make contact with certain ones of the stationary bars *b* and not the others.

Each rock-shaft is represented in the keyboard D by a separate key formed of a metallic bar 30, pivotally attached at one end to a fixed support 31 and having a finger-piece 32, bearing a distinguishing-letter. Each key 30 controls the circuit of an electromagnet *p* on the switchboard situated in front of an armature-piece 28 on its corresponding rock-shaft. Whenever a current is passed through the coils of the magnet, it attracts the armature, and thereby turns the rock-shaft and sets all the contact-strips 26 in contact with the stationary bars beneath it.

The top rails 33, extending across the switchboard lengthwise, support the electromagnets *p* above the rock-shafts, each with its pole in close relation to the armature-piece of its rock-shaft, and the number of key-levers 30 corresponding to the number of magnets. The latter are connected separately in circuit with the generator from which current is supplied to energize them by the simple movement of the key-lever against a fixed stop 34, to which one end of the magnet-coil is connected by a conductor 35. All the key-levers are connected into a common conductor $W^5$, running to one side of the generator G, while a conductor $W^6$, leading from the other side of the generator, connects with the coils of the magnets *p*, so that a circuit through a magnet *p* may be completed as often as its associated key-lever 30 is depressed against the contact-stop 34.

Figure 14:
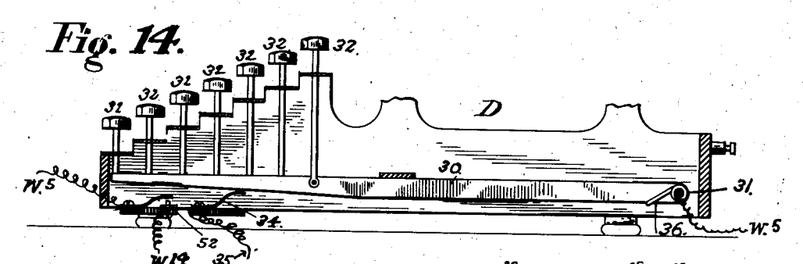
Fig. 14 is a longitudinal section through the keyboard and the contacts operated by the keys.
Figure 15:
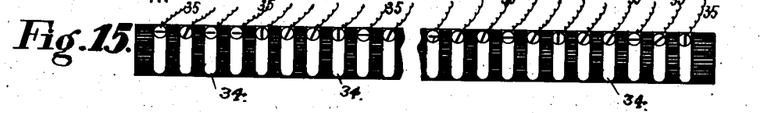
Figs. 15 and 16 are details of the contacts under the key-levers.
Figure 16:
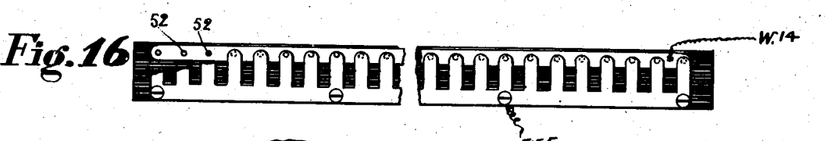

A spring 36, Fig. 14, holds the lever 30 normally away from the contact 34 and serves to open the circuit at that point at the instant that the operator releases the key after having depressed it. These connections are the same for all the magnets *p*. Other keys 39 40 are provided in the keyboard in addition to the letter or character selecting keys, one of which, 40, is an ordinary circuit opening and closing key for connecting or disconnecting at will the mechanism and the generator, whereas the other, 39, termed the "throw-off key," is arranged in the conductors that connect the circuit-selecting mechanism on the panels with one side of the generator-circuit through the keyboard. The lever constituting this throw-off key 39 is connected into one side of the generator by a conductor $W^8$ and stands normally away from the fixed stop 41, that forms the terminal of the conductor $W^9$, common to all the panels. This key 39 controls the operating-circuits in all the panels through the medium of the relays *s* and armatures 44, which compose the means for operatively disconnecting a panel from the switchboard mechanism and bringing the preceding panel into operation to be again set for displaying a given letter. As fast as the last-operated key 30 in the keyboard is released and another is about to be selected and depressed to form the next letter in the sign the connections between the switchboard and the panel last operated on are cut off and the switchboard becomes connected into the next panel.

Figure 1:
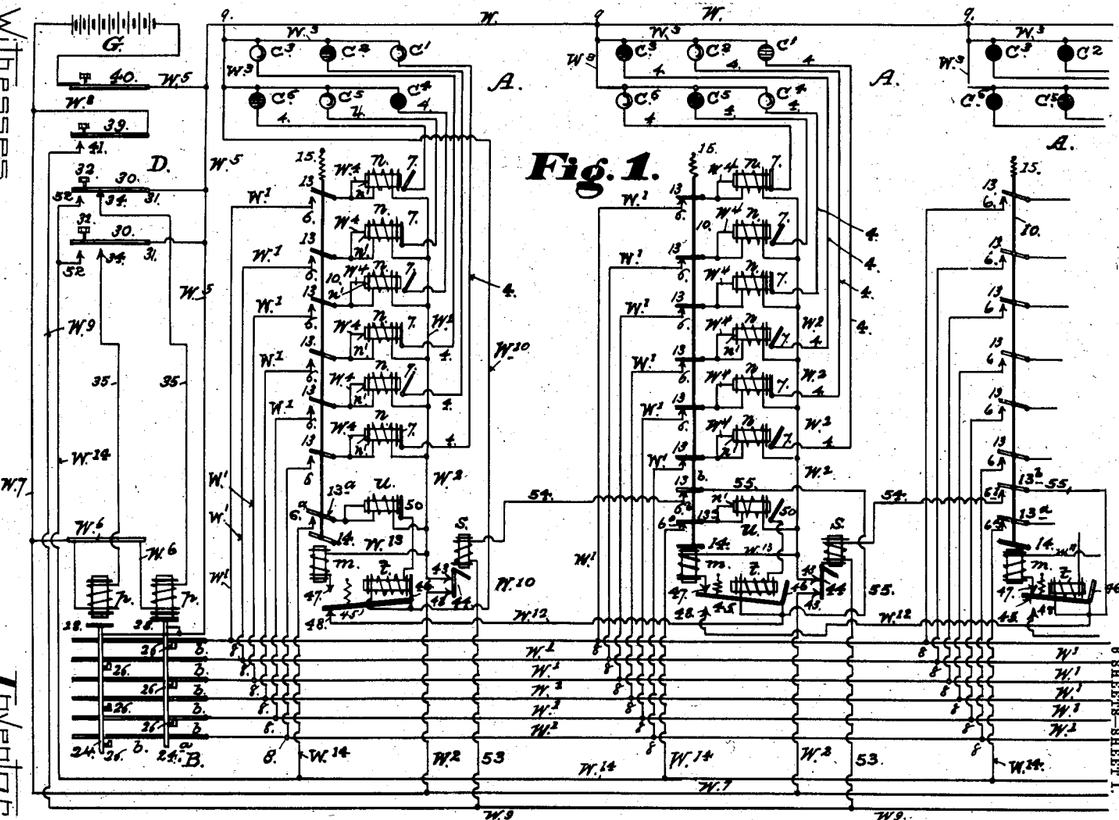
Figure 1 is a diagrammatic representation of the illuminating-circuits for a part of the whole number of lamps contained in two adjacent panels, together with the circuits of two letter-keys and two switch-keys in the keyboard, and the generator for supplying the current. A portion of the lamp-circuits in the third panel is also shown in this figure.
Figure 2:
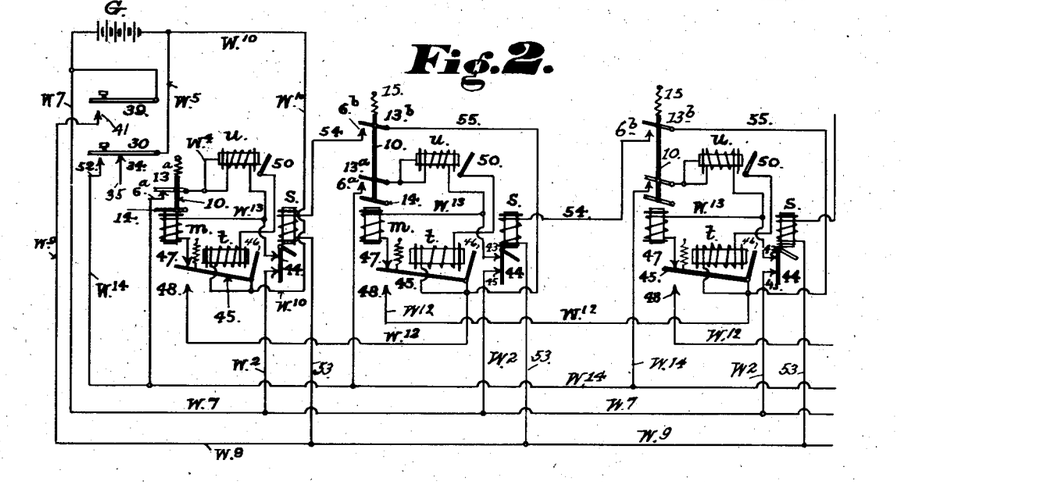
Fig. 2 is a diagram representing the normal position of the circuit-controlling means for three panels before the same are actuated from the keyboard and by the operation of which the switchboard is operatively disconnected from one panel and transferred to the next panel in succession. The illuminating-circuits and their circuit-closing relays are not shown.
Figure 3:
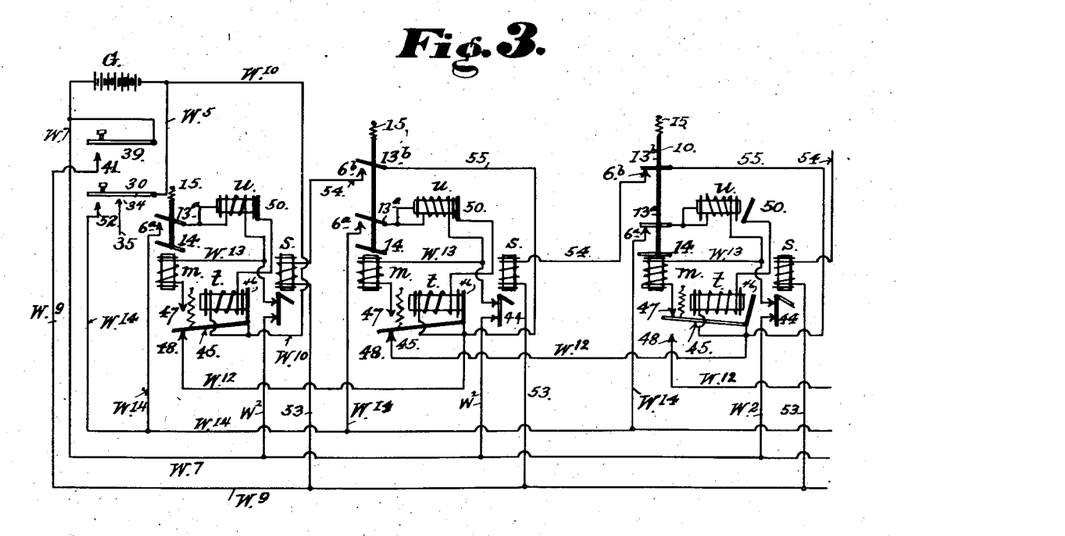
Fig. 3 is a similar diagram illustrating the position of the parts after the keys for particular letters have been pressed to produce those letters in the first and second panels and the switchboard is disconnected from those panels and connected for operation into the third panel. The circuit-closing relays and the circuits for supplying current to the lamps on the third panel are omitted in this diagram.

The mechanical features of the cut-out and transferring mechanism are seen in Figs. 6 and 7, and diagrams Figs. 1, 2, and 3 illustrate the manner in which the parts are connected in circuit with the source of current through the switchboard and are controlled from the keyboard.

The three circuit-closing relays *m t u* on every panel operating on the circuit-closing levers 14 45 50 control the connection between the common source of current and the illuminating-circuits of the panel in such manner that on depressing a key in the keyboard at the beginning of the operation to form a word or sentence a letter corresponding to the letter borne by the key is formed on the first panel, and on releasing the key the operative connection between the switchboard and the first panel, whereby the lamp-circuits are selected and connected into the source of current, is cut off or carried through or around the first panel and is transferred to the second panel without disturbing the circuits necessary to light the lamps in the first panel.

As already mentioned in the detailed description of the panel and as seen in the diagram Fig. 1, one side of every lamp is connected into one side of the generator by the conductor W, and from the other side of the lamp a lead 4 terminates at the contact-strip 7, which when attracted by its relay $n$ closes the circuit to the opposite side of the generator through the core $n'$ of the relay, as well as through its windings, and over the connecting-wire $W^2$ to the conductor $W^7$ and thence to the opposite pole of the generator. In this last-mentioned connection the circuit-closing armature 44 in contact with stops 43 holds the circuit normally closed, but also serves, when drawn away from the stops, to open the circuit at that point.

The relay $s$, connected in normally open circuit with the generator through the throw-off key 39, becomes energized at the instant that key is depressed, and by attracting its armature 44 it opens the circuit at the points 43, the effect of which is to break the connection between the source of current and all the selecting-magnets $n$ in the panel, and thus restore them to position ready for setting the circuits for another letter.

The key 39 is brought into use only to correct mistakes in selecting and pressing one letter-key when another is required. Ordinarily the circuit remains closed at the stops 43.

The second one, $t$, of the three relays $m$ $t$ $u$ acts upon the circuit-closing lever 45, and on the release of the letter-key that was last depressed it operates by attracting the armature-lever 45 to cut out the mechanism of the panel just acted on and to transfer or carry the connection with the switchboard to the next panel ready to repeat the operation of selecting and putting in circuit the lamps for the next letter.

The lever 45 of the first panel of the series is permanently connected by a wire $W^{10}$ into the conductor W of the generator-circuit. Each lever is rigidly attached to or formed as a member of a hinged pole-piece 46, situated in front of the pole of the relay $t$. In its normal position away from the relay $t$ the lever is in contact with a stop 47, that forms the terminal of one end of the coil of the relay $m$, or when attracted by its relay the lever 45 leaves that stop and drops onto the contact-stop 48 beneath it, thus cutting out the relay $m$ and closing a circuit over the wire $W^{12}$ to the corresponding parts on the next panel, where, the lever 45 being in its normal position against the upper stop 47, a circuit is completed through the coils of the magnet $m$, that actuates the circuit-closer 10 of that panel.

The third relay $u$ operates first to close a circuit through the coils of the relay $t$ in the same panel, and then after its own armature 50 and the armature 46 of the relay $t$ have been attracted the magnet $m$ of the next succeeding panel is put into circuit connection with the generator, as has just been set forth in describing the operation of the relay $t$. To effect this operation, the relay $u$ is wound and connected in the same manner as the magnets $n$, excepting that its circuit-closing armature 50 forms the terminal of one end of the windings in the relay $t$, whereas the circuit-closers 7 of the magnets $n$ are the individual terminals of one side of the lamp-circuits. The relay $u$ is preferably similar in construction to the electromagnets $n$ and is preferably so situated as to be connected with the generator simultaneously with the connection of such electromagnet therewith. To effect this, the contacts for the relay $u$ (designated $6^a$ and $13^a$) are arranged to be brought together whenever the magnet $m$ is energized, the movable member $13^a$ being connected with the rocking bar 10. The result of this arrangement of the three relays $m$, $t$, and $u$ on every panel is that the relay-magnet $m$ first operates to set parts of the apparatus of that panel next to be lighted to operative relations. Then after the lamps of that panel have been lighted the relay $u$ is brought into operation, and this in turn causes the circuit through the relay-magnet $t$ to be closed, the circuits through these two relay-magnets $u$ and $t$ remaining closed so long as lamps in the panel to which they belong remain illuminated. When the relay-magnet $t$ becomes energized, its armature-lever 45 is attracted and the circuit of the relay-lever $m$ is broken at the point 47, but at the same instant the corresponding relay-magnet $t$ in the next succeeding panel is connected with the generator by the engagement of the armature-lever 45 with the contact 48, the circuit from the generator being by wire $W^{10}$, armature-lever 45, contact 48, wire $W^{12}$ to the second panel, armature-lever 45 at that panel, contact 47 and windings of the relay $m$. In the same manner the second panel is cut out, and the connection between the contact-bars $b$ on the switchboard and the local-circuit conductors in the third panel is completed ready for selecting the proper lamp-circuits in that panel by depressing the required letter-key in the keyboard.

As the magnets $n$ and $u$ have their cores connected into the conductors of the generator-circuit through the windings of the spools, as before explained, it will be evident that they will continue to attract their respective circuit-closing armatures and maintain the circuits even after the connections with the switchboard are opened at the contact-points 6 13. Consequently the bars $b$ of the switchboard can be connected in circuit with the series of circuit-closing relays $n$ on one panel as rapidly as they are disconnected from the previously-illuminated panel without disturbing the continuity of operation of the illuminating-circuits.

In a set of panels A, wired and connected together through the above-described parts and conductors, each panel will be a counterpart of the others, excepting that the circuit-closer 45 on the first panel will be connected by the conductor $W^{10}$ directly into the conductor W, running to one side of the generator, whereas the corresponding lever 45 on the second panel will be connected into that side of the generator-circuit only through the lever 45 of the first panel, the lever 45 of the third panel through that on the second panel, and so on. The result of this arrangement is that the generator will be closed on the magnet $m$ on the first panel at the moment that the switch-key 40 in the keyboard is closed; but the circuit - closing means on the other panels will be brought in succession into action only after a letter-key has been depressed and released to illuminate the proper lights in the first panel.

The arrangement of the circuit-selecting and the transferring means by which an operative connection between the switchboard and the panels is first made and then broken in regular succession throughout the whole set of panels will be understood from the following description of the operation of the mechanism of three panels, in connection with Figs. 1, 2, and 3.

Before the generator is connected for operation the parts stand in the position represented in the diagram Fig. 2, excepting that the switch 40 is open and the magnet $m$ of the first panel is not acting. On closing the switch 40, however, a current is caused to pass from one side of the generator over the conductor $W^{10}$ to the lever 45, thence to the coil of the magnet $m$ and over the conductors $W^{13}$ and $W^2$ to the return-conductor $W^7$, running to the opposite side of the generator. Magnet $m$, thereupon acting on the circuit-closer 14, connects the conductors W', leading from the contact-bars $b$ of the switchboard, with the electromagnets $n$, that control the lighting-circuits in the first panel, and every bar $b$ is thus in electrical connection with the illuminating-circuits which it is arranged to control in that panel. By the same movement of the circuit-closer 14 the relay $u$ is connected, through the contacts $6^a$, the stop $13^a$, and the conductor $W^{14}$, with the contact-stop 52, situated under every letter-key, so that whatever key may be selected and pressed the relay $u$ will become energized, and by attracting the drop 50 it will complete a circuit through the coil of the relay $t$, but only after the letter-key through the contact-stop 34 beneath its lever 30 has already closed the circuit on its proper magnets in the set $p$ on the switchboard, and thus actuated the movable selector or rock-shaft 24. The position of these parts in the first and second panels after such movements of the letter-keys is indicated in Fig. 3, wherein the connections between the second panel and the switchboard through the first panel and of the third panel through the second and the first panels are traced as follows:

On depressing a letter-key its lever 30 makes contact first with the stop 34, and the current passing through the conductor $W^5$, the key-lever, and the conductor 35 to the coils of the selected magnet $p$ in the switchboard causes that magnet to move the rock-shaft 24, through which, as before explained, a circuit from one side of the generator over the conductor $W^5$ and through the rock-shaft 24 and its contact-springs 26 is completed to every one of the bars $b$ touched by the springs. The magnets $n$ on the third panel (not shown in Fig. 1) thereupon become energized, receiving their current from the generator over the following circuit—viz., wire $W^{10}$ to armature-lever 45 of the first panel, the stop 48, with which that lever engages, the wire $W^{12}$ between the first and second panels, the armature-lever 45 of the second panel, the wire $W^{12}$ to the third panel, the armature-lever 45, the stop 47, with which such lever is in contact, the windings of the relay-magnet $m$ at panel three, the wire $W^{13}$, lever 44, and wires $W^2$ and $W^7$ back to the generator.

By contact with the second stop 52 the key-lever 30 also causes a current to pass over the wire $W^{14}$ to the stops $6^a$ $13^a$ and through the windings of the relay $u$, which thereupon attracts its armature 50 and closes a circuit through the coils of the relay $t$, as already described, which throws the lever 45 from the upper stop 47 to the lower stop 48. The circuit from one side of the generator over the conductor $W^{10}$ then will be traced as follows: From the point where the conductor $W^{10}$ is tied to the lever 45 the current passes over the lever 45 to the point 48 and thence over the conductor $W^{12}$ to the lever 45 of the next panel to stop 47, around magnet $m$, stop 43, and return-wires $W^2$ and $W^7$.

The operation of the different circuits and the controlling mechanisms on the keyboard, the switchboard, and the separate panels comprising a complete sign will be readily understood by tracing the operating-circuits between the switchboard and the illuminating-circuits of six lamps on the first and second panels, as illustrated in Fig. 1, where the lamps indicated at C' C² C³ C⁴ C⁵ C⁶ on the second panel correspond to those on the first panel.

On closing the key 40 at the keyboard the relay $m$ of the first panel sets the circuit-closer 14 and closes the local circuits of all the relays $n$ at the points 6 13, whereupon the circuit is traced from one side of the generator G through the key 40, over the conductor W and connections W³, to one side of all the lamps, from which point the circuit continues over the connections 4 to the contacts 7. From the same side of the generator a current passes over the conductor W⁵ to every rock-shaft 24 in the switchboard, which thereupon becomes a terminal of one side of the common generator. The rock-shafts standing normally out of contact with the switch-bars $b$, however, the circuits remain open until by depressing a selected letter-key in the keyboard its lever 30 touches the first contact-stop 34 beneath it. When that takes place, a current passes over the conductor W⁵ through the key-lever 30 and the stop 34 to the conductor 35, running to the selecting-relay $p$ on the switchboard, where it traverses the coil and returns to the opposite side of the generator over the conductors W⁶ W⁷. The relay $p$ then closing the contacts on those bars $b$ which are controlled by the rock-shaft 24 completes over the conductors W' separate circuits to the relays $n$ through the contact-points 6 13, previously closed by the action of the relay $m$. Diagram Fig. 1 represents the second selector 24ᵃ as being closed on the first, third, and fifth bars, the first selector being now inactive, though having already been operated to light lamps in the first panel.

The separate circuits selected at the switchboard are consequently carried by the conductors W' through the windings of the first, third, and fifth relays in the set $n$ on the second panel, and the circuits of the correspondingly-numbered lamps are closed as the contacts 7 are attracted to the cores $n'$ of the selected relays. In this manner the lamp connected to each circuit-closer 7 thus drawn to the core of a relay $n$ is connected into both sides of the generator, because the conductor W³ from one binding-post 2 of the lamp runs to one pole, and the circuit from the other binding-post 3 is carried over the conductor 4 through the contact 7, the core $n'$ of the relay, the conductor W⁴, the windings of the relay to the conductor W², and thence directly over the connection W⁷ to the opposite pole of the generator.

The key 30 in its downstroke after touching the stop 34 and before being released comes into contact with the second stop 52 under its front end, thereby completing a circuit from one side of the generator over the conductor W⁵, the key-lever 30, and stop 52, the conductor W¹⁴, and contacts 6ᵃ and 13ᵃ to the relay $u$ of the panel that has just been lighted and then by conductors W² and W⁷ back to the generator. The relay-magnet being energized attracts its armature and establishes a new circuit for itself, including the relay-magnet $t$, as follows: W¹⁰ from the generator, through the windings of the relay-magnet $t$, to the armature 50 of the magnet $u$, through the core and then the windings thereof, and thence back to the generator by the wires W² and W⁷.

The relay $t$ having come into play opens the circuit of the relay $m$ by setting the lever 45 away from the stop 47 and onto the stop 48, which has the effect to release the selector 10 and cause the same to open all the circuits over the conductors W' at the contacts 6 13 on the panel and at the same time to complete the connection of the relay $m$ on the next succeeding panel with one side of the generator through the conductor W¹⁰, the lever 45 on the panel just cut out, the conductor W¹², running to the corresponding lever on the next panel, and through that lever and its front stop 47 to the coils of the relay $m$, and thence back to the opposite side of the generator over the connections and conductors W² W⁷. The circuit-closers 10 24 and the keys 30 are returned to position by springs. The parts then will complete circuits between the generator and the mechanism in the second panel as soon as a letter-key is depressed on the keyboard—as, for example, the key that controls the circuits of the first, third, and fifth lamps, as indicated in the diagram Fig. 1.

Referring to the diagram Fig. 1, it will be noticed that the illuminating-circuits are not broken when the circuit-closer 10 is released and the contacts 6 13 are separated, because each separate illuminating-circuit is carried through a contact 7, the core $n'$, and the windings of its individual relay in the set $n$ and thence by the common conductors W² W⁷ to the remaining side of the generator.

The throw-off key 39 furnishes a means for opening the circuit through a panel in case of a mistake in selecting the wrong key during the operation of setting up a letter. By depressing the key 39 a current is passed through the coils of the relay $s$ and causes it to draw its armature-piece 44 away from the contact-stops 43, and thus break the circuit.

The relays $s$ for the panels are wired and connected as follows: One end of the coil of each relay is permanently connected by a conductor 53 into the common conductor W⁹, terminating at the contact-stop 41 of the key 39; but the other ends of the coils of the relays are connected by conductors 54 to contact-stops 6ᵇ at the selector 10 in the next following panels. The contact 6ᵇ is located under a contact 13ᵇ on the selector 10, and as the latter is moved by the relay $m$ the contacts $6^b$ $13^b$ are brought together and the conductor 54 is connected with the conductor 55, running from the stop $13^b$.

The operation of the throw-off devices will be understood from an examination of Fig. 3, it being supposed that there has been a mistake in exhibiting a wrong character on the second panel, which has just been illuminated. Under these circumstance it will be apparent, as indicated in this diagram, that the first and second panels are cut out from connection with the generator—that is to say, the relays $m$ thereof are cut out, while the connections at the third panel are properly made for the immediate illumination thereof. The operator, desiring to change the character shown at the second panel, presses the key 39 and sends a current from the generator through the electromagnet $s$ at that panel, the circuit being traced as follows: from the positive side of the generator through the key 39 and its contact by the wires $W^9$ and 53 to the electromagnet $s$ of the second panel, thence by the wire 54 to the contacts $6^b$ $13^b$ at the third panel, which are closed, because the magnet $m$ of that panel is in closed circuit with the generator, thence by the wires 55 and $W^{12}$ back to the armature-lever 45 of the second panel, thence by the wire $W^{12}$ to the armature-lever 45 of the first panel, and then by the wire $W^{10}$ to the negative side of the generator. The magnet $s$ becoming excited attracts its armature 44, and as this is a connecting-link in the circuits through the electromagnets $n$, $u$, and $t$ these circuits are all broken, the result of which is to restore the parts at the second panel to the positions just occupied by those at the third panel. This having been done, the operator presses the desired character-key 30, and the second panel is again illuminated.

It will be observed that the conductor 54 operates to connect the windings of the relay-magnet $s$ with the contacts of the next succeeding panel, and so the conductor 54 of the last panel is connected with the first panel of the series, though this is not illustrated, as the limitations of the drawings prevent the showing of the whole series of panels.

In operating the keys in the keyboard care should be taken to move each key with a rapid downstroke and to quickly release it at the instant of making contact with the stops beneath the lever. If the key be kept too long in contact with the stops 52, the current flowing over the conductors $W^{14}$ would be liable to act on several panels and produce the same letter on several at the same time. A quick sharp stroke of the letter-forming keys, on the other hand, will limit the action of the key to the particular panel with which the switchboard is connected at the time, and the panels will be acted on singly one after another.

All the panels may be thrown off and their lamps extinguished preparatory to setting up another set of letters or characters simply by opening the generator-circuit at the switch 40.

Any number of panels within practical limits can be operated and controlled through a single keyboard by the above-described mechanism and circuits. The panels may be located also at considerable distance from the keyboard without affecting the operativeness of the apparatus.

For spacing—i. e., leaving one or more panels dark between letters, signs, or words—there is a special key provided for in the keyboard D, called the "space-key." This key is not shown in the diagrams Figs. 1, 2, 3. It is similar to the other keys 30, but has only the stop 52 at its front end, and consequently controls only the relays $u$.

What I claim as my invention, and desire to secure by Letters Patent, is—

1. In an electrical sign a plurality of panels each having incandescent lamps arranged in fixed groups, a common generator-circuit, conductors connecting one side of all the lamps or groups of lamps in each panel into one side of said generator-circuit, a conductor from the opposite side of every lamp or group of lamps connecting the same by a separate circuit into the remaining side of the generator-circuit, a switchboard comprising stationary contact-bars to which the last-mentioned conductors are individually and separately connected, said contact-bars forming individual terminals on the switchboard of all said conductors, a plurality of circuit-closing selectors in the switchboard connected into one side of the generator-circuit and provided with contacts adapted by the movement of the selectors to bring certain predetermined ones to the contact-bars in circuit with the generator according to the particular selector operated, means for individually moving said selectors at will, and electrically-actuated means in the circuits between the switchboard and the panels adapted to electrically cut off from the switchboard each panel as it is illuminated by completing the circuits through certain of its lamps, and electrically connect the switchboard with the next panel in succession.

2. In an electrical sign, the combination of sign-panels each having a similar group of incandescent lamps, a generator for supplying current, conductors connecting said lamps into one side of the generator, a switchboard having separate stationary contact-bars equal in number to the lamps in each panel, connecting means separately and individually connecting the corresponding lamps in all the groups with the contact-bars, whereby the said bars form individual terminals for the same connecting means in all the groups, a plurality of circuit-closing selectors arranged to be connected with the generator and each adapted by the movement of the selector to complete a circuit through certain contact-bars according to a predetermined number and position, electrically-operated means for actuating said selectors individually, including a keyboard having a separate key for each selector, and means for electrically disconnecting the switchboard contact-bars from one panel and connecting them with another panel in succession after each operation of the switchboard.

3. In an electrical sign a plurality of incandescent lamps in groups, a generator for supplying current, conductors individually connecting the lamps into one side of the generator, a separate circuit-controlling means in the circuit between each lamp and the remaining side of the generator comprising a circuit-closing relay to each lamp-controlling circuit, a switchboard having stationary contacts equal in number to the lamp-controlling circuits, conductors separately connecting the lamp-controlling circuits with the stationary contacts to form terminals of said circuits on the switchboard, and a plurality of movable contacts arranged in predetermined varying groups with reference to the stationary contacts, key-actuated means for separately selecting and setting each movable contact upon the stationary contact with which it is adapted to coact, electrically-operated means for simultaneously disconnecting the stationary contacts in the switchboard from all the circuit-closing relays, and means electrically connecting the selected lamp-circuits through the circuit-closing relays directly into the remaining side of the generator to maintain the lamps in circuit.

4. The combination with a plurality of illuminating-circuits, including a source of current and a lamp in each circuit permanently connected into one side of the source of current and normally disconnected from the remaining side; of a switchboard having stationary contacts each of which forms a terminal of an illuminating-circuit, a plurality of circuit-selectors each adapted to control a predetermined number of the stationary contacts and connect the same into the source of current, key-actuated means for separately bringing the movable contacts into operation, and electrically-actuated means operated thereby for connecting a selected illuminating-circuit directly into the source of current around the switchboard-contacts.

5. The combination with a plurality of illuminating-circuits each having a lamp connected in open circuit into one side of a source of current, said illuminating-circuits being distributed among separate letter-forming groups in predetermined order; of a switchboard common to said groups and having a plurality of stationary contacts corresponding to the number of illuminating-circuits comprising a group, said contacts forming individual terminals of said circuits, a plurality of selectors connected with the source of current and adapted to bring into circuit a predetermined number of the stationary contacts the position of which in the switchboard corresponds to the position of the lamps in the groups connected with such contacts, a keyboard, key-operated means for separately operating the selector of each letter-forming group, an electrically-actuated cut-out between every selector and the switchboard, means actuating the said cut-outs in successive order from the movements of the selectors for operating the circuits between the switchboard-contacts and the selected group of letter-forming circuits and simultaneously connecting said switchboard-circuits into the next group of letter-forming circuits, and means connecting the said selected groups directly in circuit with the source of current outside of the switchboard-circuits.

6. The combination with an illuminating-circuit including a lamp, a source of current, a conductor connecting one side of the lamp into one side of the source of current, a switchboard having a movable contact connected with the source of current and a stationary contact forming the terminal in the switchboard of a lamp-controlling circuit, a circuit-closing relay in said circuit having one end of its windings connected into the conductor through its core and the other end connected with the source of current, whereby the circuit is completed when the circuit-closing drop of the relay is attracted to its core, circuit-closing contacts interposed between the windings of the circuit-closing relay and the switchboard-contact, and electrically-actuated means for opening and closing said circuit-closer.

7. The combination with an illuminating-circuit including a lamp in open circuit with a source of current, of a switchboard having a movable contact connected with the source of current, a keyboard-actuated means for operating the movable contact and a stationary contact which forms the terminal of a conductor running to the remaining side of the source of current, a circuit-closing relay interposed in the illuminating-circuit and adapted to normally hold that circuit open and to complete the illuminating-circuit when closed, a connection between the stationary contact of the switchboard and the windings of the circuit-closing relay, a circuit-closing device in said conductor, and means controlled from the keyboard operating to open and close at will the connection between the switchboard-contact and the circuit-closing relay.

8. In an electrical sign a plurality of illuminating-circuits, a generator supplying current, a circuit-closing relay in each circuit holding the same normally broken, a switchboard having a stationary contact individual to each illuminating-circuit, a circuit-closer in the connection between the switchboard-contact and the windings of each relay and normally breaking said connection, electrically-actuated selectors in the switchboard, normally standing away from the stationary contacts and adapted to variably connect the stationary contacts in predetermined groups into the generator-circuit, a keyboard having a key for operating each selector, means for successively closing and opening the connections between the switchboard and the circuit-closing relays by the depression and release of the selected keys, and means actuated from the keyboard for electrically disconnecting the switchboard-contacts from each selected group of illuminating-circuits and connecting the said contacts for operation to the circuit-closing relays of another group of illuminating-circuits from which another selection is to be made.

9. In an electrical sign, a plurality of illuminating-circuits including a generator for supplying current, a circuit-closing relay in each circuit normally holding the same open, a circuit provided with a circuit-closer through which the windings of each circuit-closing relay are connectible with the generator to actuate said circuit-closer, a selector therefor, and an operating-key for every selector.

10. In an electrical sign, a plurality of illuminating-circuits including a generator for supplying current, a circuit-closing relay to each circuit, an operating-circuit to each relay provided with a circuit-closer through which the windings of the relay are connectible with the generator to actuate the relay, a plurality of selectors for said operating-circuits each adapted to connect the circuit-closing relays in predetermined groups into the generator-circuit, an operating-key for each selector, and cut-out mechanism for each selector actuated by the same key.

11. In an electrical sign, a plurality of illuminating-circuits connected into one side of a common generator, a circuit-closing relay to each circuit operating to complete the said circuit to the opposite side of the generator, an operating-circuit to every circuit-closing relay, a circuit-closer through which it is connectible into the windings of the circuit-closing relay to energize the same, a switchboard having a stationary contact-bar for each operating-circuit and forming a terminal of said circuit, a plurality of movable selectors connected in circuit with one side of the generator and comprising a plurality of separate contact-strips arranged on a movable carrier in predetermined order for selecting and making contact with the stationary contact-bars in varying relations as to their position in the switchboard, an operating-key for actuating each movable carrier, and a circuit-opening key for throwing off the illuminating-circuits at will.

12. The combination of a generator, illuminating-circuits normally open, a circuit-closer in each circuit including a relay through which the illuminating-circuit is closed on the generator, an operating-circuit to each relay provided with a circuit-closer through which one side of the operating-circuit is connected into the windings of the circuit-closing relay, means for operatively connecting the opposite side of said operating-circuit into the generator and key-actuated means for actuating the circuit-closers of the operating-circuits in predetermined number and relation.

13. In combination with a plurality of electrically-operated illuminating-circuits standing normally open, a circuit-closing device to every circuit, an operating-relay to each circuit-closer, a switchboard provided with circuit-closing means operating to close a circuit through each operating-relay, and key-actuated selecting means for simultaneously closing the operating-circuits of the said relays in predetermined number and relation and thereby close the illuminating-circuits controlled by the operated relays.

14. In combination a source of current, a plurality of illuminating-circuits arranged in groups, electrically-actuated circuit-closing devices in each circuit, operating-circuits corresponding in number to the illuminating-circuits contained in a group, circuit-closers for connecting said operating-circuits into the source of current, and key-operated selectors for connecting said operating-circuits into the circuit-closing devices of each group of illuminating-circuits in predetermined number and in successive order.

15. In combination, a source of current, a plurality of illuminating-circuits arranged in groups, electrically-actuated circuit-closing devices in the circuits contained in every group; a common switchboard having contact-bars equal in number to the circuits in a group and to which the corresponding illuminating-circuits in all the groups are connected in open circuit each through a separate operating-circuit, circuit-closing devices in said operating-circuits between the contact-bars of the switchboard and the circuit-closing devices of the illuminating-circuits; movable selectors adapted to connect the contact-bars with the source of current in varying number and relation, key-controlled means for actuating said selectors in required order; and a cut-out mechanism to every group of illuminating-circuits.

ANATOLE C. HEINY.

Witnesses:
J. LYNN EDDY,
E. I. GILBERT.